United States Patent [19]

Weld et al.

[11] Patent Number: 4,629,936
[45] Date of Patent: Dec. 16, 1986

[54] TUNGSTEN-HALOGEN LAMP WITH MEANS FOR REDUCING FILAMENT EMBRITTLEMENT

[75] Inventors: Thomas G. Weld, Swampscott; Mark D. Beschle, Danvers, both of Mass.

[73] Assignee: GTE Products Corporation, Stamford, Conn.

[21] Appl. No.: 700,361

[22] Filed: Feb. 11, 1985

[51] Int. Cl.⁴ .......................... H01K 1/50; H01K 1/54
[52] U.S. Cl. .................................................. 313/579
[58] Field of Search ......................................... 313/579

[56] References Cited

U.S. PATENT DOCUMENTS 1,600,203  9/1926  Campbell .
3,538,373 11/1970  Linden et al. .
3,712,701  1/1973  Johnston et al. .
3,912,960 10/1975  Danko ................................. 313/579
3,912,961 10/1975  Rees et al. ........................... 313/579
4,039,879  8/1977  T'jampens et al. .................. 313/579
4,532,455  7/1985  Connor et al. ...................... 313/579

*Primary Examiner*—Palmer C. DeMeo
*Attorney, Agent, or Firm*—José W. Jimenez

[57] ABSTRACT

A tungsten-halogen lamp is provided that incorporates therein means for substantially reducing filament embrittlement. The embrittlement reducing means comprises substances X and Y, which have an X and Y mass ratio of about 30:1. Substance X is a phosphorus-based gaseous compound and substance Y is a carbon-containing gaseous compound. Substance X is preferably phosphine and substance Y is preferably methyl bromide.

4 Claims, 1 Drawing Figure

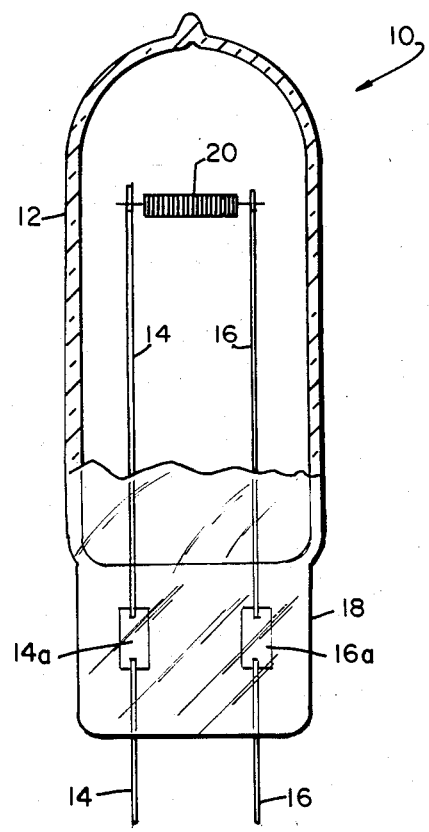

TUNGSTEN-HALOGEN LAMP WITH MEANS FOR REDUCING FILAMENT EMBRITTLEMENT

CROSS REFERENCE TO CO-PENDING APPLICATIONS

In co-pending application, filed under U.S. Ser. No. 700362, 2/11/85 ("Tungsten-Halogen Lamp With Organic and Inorganic Getters"), there is defined a lamp having a carbon-containing gaseous getter and a phosphorus-based gaseous getter, in combination, for the purpose of substantially eliminating the contaminants contained within the lamp. This Application is filed concurrently herewith and is assigned to the same assignee as the instant invention.

In co-pending application having Ser. No. 321,994 ("Electric Lamp Including Oxygen Getter"), there is defined a lamp containing phosphine ($PH_3$) gas for the purpose of serving as an oxygen getter. This application was filed on Nov. 16, 1981 and was assigned to the same assignee as the instant invention.

TECHNICAL FIELD

This invention relates to incandescent lamps and more particularly to tungsten-halogen incandescent lamps. Still more particularly, it relates to lamps of the latter variety having means, incorporated therein, for reducing filament embrittlement contained within and for preventing filament sag.

BACKGROUND OF THE INVENTION

The majority of incandescent lamps today use a filament made from tungsten wire which can be of the single or coiled coil design. When initially energized to incandescence, the filament will metallurgically recrystallize, physically sag under gravitational attraction and, in lamps where the filament wire is fine, will become brittle or distorted due to the presence of any carbon in the lamp. Coiled coil filaments, for the most part, have more of a tendency of becoming brittle or distorted than to single coil filaments and fine wire has more of a tendency of becoming brittle or distorted than does heavy wire.

Embrittlement and coil distortion in tungsten filaments have never been completely eliminated. However, they can be significantly reduced by utilizing a controlled heating process at the time of initial light-up. Flashing is one particular process known for doing this and is now in common use. Briefly, flashing is a method of stabilizing a filament. It is usually done after the coil is mounted in the lamp and can be performed either before or after tip-off. Since the filament as received is not brittle, it does not require hand mounting and, therefore, can be mounted inexpensively via high speed automatic equipment.

Unfortunately, a fine wire filament in an incandescent lamp will continue to deteriorate and become more brittle during subsequent lamp operation in spite of flashing. This is generally attributed to the formation of tungsten carbide, a more brittle material (due to excess carbon), at the surface of the filament. The formation of tungsten carbide leads to slippage at the grain boundaries at the surface of the filament. The embrittlement problem is significant in fine wire filaments (less than 0.005 inch diameter) since there is less material in the cross-section of the wire to overcome defects or weaknesses in the surface of the filament wire.

It is believed, therefore, that a tungsten-halogen lamp that provides for means for substantially reducing filament embrittlement within a lamp would constitute an advancement in the art.

DISCLOSURE OF THE INVENTION

It is, therefore, a primary objective of this invention to overcome the advantages of the prior art devices such as mentioned above.

It is another object of this invention to provide a lamp with means for subtantially reducing filament embrittlement, thereby enhancing the performance of such a lamp.

In accordance with one aspect of the present invention, there is provided a tungsten-halogen incandescent lamp comprising a light transmitting, hermetically sealed, envelope and a pair of lead-in wires press sealed in the envelope and extending internally and externally of the envelope. In addition, the lamp includes a tungsten filament attached between the internal ends of the lead-in wires and a fill gas within the envelope consisting of an inert gas and a halogen or halide. Furthermore, the lamp includes means for substantially reducing filament embrittlement, located within the envelope, which comprises substances X and Y. The substances have an X to Y mass ratio in the range of about 30:1 to about 1:1.

BRIEF DESCRIPTION OF THE DRAWING

The FIGURE illustrates one embodiment of the tungsten-halogen lamp made in accordance with the teachings of the present invention.

BEST MODE FOR CARRYING OUT THE INVENTION

For a better understanding of the present invention, together with other and further objects, advantages, and capabilities thereof, reference is made to the following disclosure and appended claims in conjunction with the above described drawing.

Referring now to the drawing with greater particularity, the FIGURE shows a tungsten-halogen lamp 10 made in accordance with the teachings of the present invention. It is to be understood that lamp 10 is representative of only one of several varieties of electric lamps capable of successfully utilizing means for substantially reducing filament embrittlement in the lamp of the instant invention. Accordingly, the scope of the invention is not to be limited to the particular lamp 10 as shown and described herein below.

Lamp 10 has a tubular envelope 12 made of a suitable light-transmitting material such as quartz or a borosilicate or aluminosilicate glass. A pair of lead-in wires 14 and 16 are press sealed in envelope 12 at press seal 18. Lead-in wires 14 and 16 are formed from a material, such as molybdenum, which will form a relatively strain-free hermetic seal with glass envelope 12. Further, as illustrated, the lead-in wires 14 and 16 may include respective foil portions 14a and 16a within press 18 to facilitate such a seal. A tungsten filament structure 20, such as a coiled coil designed, for example, for 45-watt, 120-volt operation, it attached to the internal ends of lead-in wires 14 and 16. Envelope 12 is filled with a fill gas comprising an inert gas and a halogen or halide. Suitable examples of such an inert gas include argon and nitrogen. The halogen or halide additive, e.g., iodine or an iodide, which is in the gaseous state under the heat of lamp operation or may be incorporated as part of a gaseous compound, functions to reduce the coloration of the lamp envelope.

Lamps of the above variety are known today and examples of other halogens that have been used within the lamp envelope include bromine and chlorine or respective halides thereof. Typically, the halogen or halide sealed in the lamp reduce envelope blackening and maintain the color temperature for the life of the lamp. In operation, tungsten particles from filament structure 20 evaporate and collide with the halogen gas particles, resulting in a chemical combination and formation of a halide. The halide in turn disassociates at high temperatures in the vicinity of the filament. Accordingly, tungsten particles are deposited on the filament and the halogen gas released to subsequently effect once again the described combination. The result of the above activity is a self-cleaning lamp which never darkens and yet produces maximum light output over its entire life.

Substances, such as carbon, may be present in a lamp as an impurity or as a deliberate additive. Some carbon may be added intentionally as part of a halide fill gas for the lamp. While carbon may provide some desirable effects, such as oxygen gettering, it often has an adverse effect on the filament, which may vary in degree of severity depending on dosing levels and the lamp type. The adverse effect usually takes the form of gross filament distortions or embrittlement of the filament wire, ultimately leading to reduced lamp life. Filament embrittlement and distortion problems are most apparent in fine wire filaments (e.g., having a wire diameter of less than 0.005 inch). As previously stated, the tungsten particles in the lamp combine with the excess carbon to create tungsten carbide, a material that is inherently weak and brittle and creates a brittle surface for the filament wire. Since the filament wire is thin there is insufficient material in the cross section of the wire to provide support for the weaknesses on the surface. Therefore surface weaknesses do present a significant problem in lamps having thin wire filaments.

In the present invention, lamp 10 is provided with means for substantially reducing embrittlement of filament 20. The filament embrittlement reducing means comprises substances X and Y, which have an X to Y mass ratio in the range of about 30:1 to about 1:1. Specifically, substance X is a phosphorus-based compound and substance Y is a carbon-containing compound. Both X and Y are preferably in gaseous forms and are located within lamp 10. The phosphorus in the phosphorus-based compound (X) and the carbon in the carbon-containing compound (Y), in combination provided superior oxygen gettering qualities than either subtance alone. In addition, the phosphorus aids in substantially reducing the carbon attack on the filament, and the subsequent embrittlement problems that accompany fine wire filaments (less than 0.005 inch in wire diameter), by inhibiting the formation of tungsten carbide on the surface of the filament. Since the combination of the tungsten and carbon particles normally tends to weaken the surface of the filament, and promote slippage at the grain boundaries, any mechanism or means that would inhibit such a reaction would substantially reduce the filament embrittlement problem.

In a preferred embodiment, it has been discovered that the preferred phosphorus to carbon mass ratio was 8:1. Specifically, in one example of a preferred embodiment of the invention, 12 micrograms of phosphorus and 1.5 micrograms of carbon were found to be the preferred mass quantities in a 45-watt lamp having a filament with a wire diameter of 0.002 inch. The carbon-containing compound (X) used here was methyl bromide ($CH_3Br$), a halide, which also served as the source of halogen needed in the lamp. The phosphorus found to be the most effective was the yellow-type phosphorus. The phosphorus-based compound used here was phosphine ($PH_3$).

The quantity of the carbon-containing compound and the phosphorus-based compound required in a particular lamp may vary depending on the diameter of the filament wire and the volume of the lamp vessel used, but should be of such quantity that is sufficient to effectively inhibit the formation of tungsten carbide within the particular lamp. As the halide dose is increased, so must the phosphorus and the carbon dosages be increased. The phosphorus and carbon dosages also increase with wattage.

Lamps made in the past not incorporating the aforementioned gaseous compounds have exhibited early signs of failure or have been unable to reach lifetimes of four to five thousand hours. Lamps presently made with the carbon-containing and phosphorus-based compounds have not exhibited signs of early failure, have achieved lives of over four thousand hours and have produced lamps of superior quality.

Thus, there has been shown and described a tungsten halogen lamp having means incorporated therein for substantially reducing embrittlement of the filament contained within the lamp. More particularly, the filament embrittlement reducing means comprises substances X and Y, which have an X to Y mass ratio in the range of about 30:1 to about 1:1. Substance X is a phosphorus-based compound and substance Y is a carbon-containing compound, both preferably in gaseous forms. The aforementioned embodiment should serve only to clarify the manner in which the invention operates and not to limit its application to other lamps.

While there have been shown what are at present to be the preferred embodiments of the invention, it will be apparent to those skilled in the art that various changes and modifications can be made therein without departing from the scope of the invention as defined in the appended claims.

What is claimed is:

1. A tungsten-halogen incandescent lamp comprising;
   a light transmitting, hermetically sealed envelope;
   a pair of lead-in wires press sealed in said envelope and extending internally and externally of said envelope;
   a tungsten filament, attached between the internal ends of said lead-in wires, having a wire diameter of about 0.005 inch or less;
   a fill gas within said envelope comprising an inert gas and a halogen or halide; and
   means for substantially reducing filament embrittlement located within said envelope, said filament embrittlement reducing means comprising substances X and Y, said substances having an X to Y mass ratio in the range of about 30:1 to about 1:1., wherein said substance X is a phosphorus based compound that includes phosphine and said substance Y is a carbon-containing compound that includes methyl bromide.

2. The lamp according to claim 1 wherein the phosphorus content is in an amount of about 12 micrograms.

3. The lamp according to claim 2 wherein the carbon content is in an amount of about 1.5 micrograms.

4. The lamp according to claim 2 wherein said phosphorus is of the yellow-type phosphorus.

* * * * *